(12) United States Patent
Kim et al.

(10) Patent No.: US 10,503,190 B2
(45) Date of Patent: Dec. 10, 2019

(54) RESIDENTIAL-AREA-ENERGY-MANAGEMENT APPARATUS AND METHOD USING SOCIAL NETWORK

(71) Applicant: ELECTRONICS AND TELECOMMUNICATIONS RESEARCH INSTITUTE, Daejeon-si (KR)

(72) Inventors: Hyun Hak Kim, Daejeon-si (KR); Tae Wook Heo, Sejong-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 264 days.

(21) Appl. No.: 15/014,472

(22) Filed: Feb. 3, 2016

(65) Prior Publication Data

US 2016/0231764 A1 Aug. 11, 2016

(30) Foreign Application Priority Data

Feb. 6, 2015 (KR) .................. 10-2015-0018924

(51) Int. Cl.
*G05B 15/00* (2006.01)
*G05F 1/66* (2006.01)

(52) U.S. Cl.
CPC .............. *G05F 1/66* (2013.01); *G05B 15/00* (2013.01)

(58) Field of Classification Search
CPC ..................................................... G05B 15/00
See application file for complete search history.

(56) References Cited

U.S. PATENT DOCUMENTS

| 8,589,112 B2 | 11/2013 | Tsypin et al. | |
| 8,977,404 B2 | 3/2015 | Benes et al. | |
| 2008/0306985 A1* | 12/2008 | Murray | G06Q 10/10 |
| 2009/0307034 A1* | 12/2009 | Duff | G06Q 10/04 705/7.39 |
| 2012/0265586 A1* | 10/2012 | Mammone | G06Q 30/02 705/14.1 |

(Continued)

FOREIGN PATENT DOCUMENTS

| JP | 2003-316922 A | 11/2003 |
| KR | 10-0963188 B1 | 6/2010 |

(Continued)

OTHER PUBLICATIONS

Allessandra; May 31, 2011; "Energy social network Welectricity is a winning idea", 2 pages; GVEP International.

(Continued)

*Primary Examiner* — Ronald D Hartman, Jr.

(57) ABSTRACT

An energy management method for a residential area, the method comprising, in response to an energy management request from a user who lives in the residential area, collecting environment information and energy information on a household of the user, selecting an imitation target among households which have environment information and energy information similar to the environment information and the energy information on the household of the user from among all households in the residential area, setting a method for applying the energy information on the imitation target, and controlling energy management of the household of the user according to the set method.

6 Claims, 10 Drawing Sheets

(56) References Cited

U.S. PATENT DOCUMENTS

2015/0319056 A1\* 11/2015 Inoue .................. G06Q 30/04
709/224
2015/0338238 A1\* 11/2015 Gelonese ............... H04L 12/12
705/14.1

FOREIGN PATENT DOCUMENTS

| KR | 20120097460 A | 9/2012 |
| KR | 10-1227124 B1 | 1/2013 |
| KR | 10-1365168 B1 | 2/2014 |

OTHER PUBLICATIONS

Adam Bluestein; "Myenergy CEO Ben Bixby's Eureka Moment Literally Involved a Light Bulb" Apr. 6, 2012; Fast Company & Inc, © 2016 Mansueto Ventures, LLC; 4 pages.
Steven Castle, "Can Facebook Get People to Save Energy?", Apr. 4, 2012; 2 pages; http://greentechadvocates.com/2012/04/04can-facebook-get-people-to-save-energy/.
Steven Castle, "MyEnergy Looks to Gamify Energy Efficiency", Apr. 19, 2013; 3 pages; http://greentechadvocates.com/2013/04/19myenergy-looks-to-gamify-efficiency/.
Steven Castle; "Which Works Better: Behavior Change or Automation?", Jun. 21, 2011; 2 pages; http://greentechadvocates.com/2011/06/21/which-works-better-behavior-change-or-automation.
Susan Johnston; "My Energy Helps Consumers Track Energy Savings", Apr. 22, 2013; 2 pages; http://venturefizz.com/blog/myenergy-helps-consumers-track-energy-savings.

\* cited by examiner

FIG. 6

<USER'S BASIC INFORMATION>
CONSTRUCTION: $1^{ST}$ FLOOR, SOUTH-FACING, CORRIDOR TYPE,
FOUND IN 2013, LOCATED IN THE MIDDLE OF CORRIDOR
ESTABLISHED CONSUMING RESOURCE: GAS(...), ELECTRICITY(...),
WATER(...), USING SYSTEM AIRCONDITIONER
SENSOR: BED ROOM (TEMPERATURE, HUMIDITY, ILLUMINATION),
LIVING ROOM (TEMPERATURE, HUMIDITY, ILLUMINATION),
ROOM 1 (TEMPERATURE), ROOM 2 (TEMPERATURE),
VERANDA 1 (TEMPERATURE), VERANDA 2 (TEMPERATURE)
RESIDENT INFORMATION AND AVERAGE RESIDENTIAL DURATION:
TWO PEOPLE (A-24 HOURS, B-12 HOURS<20:00~08:00>)

FIG. 7

<INFORMATION FOR EXTRACTING SIMILAR USER>
CONSTRUCTION: 1ST FLOOR, SOUTH-FACING,
CORRIDOR TYPE, ESTABLISHED IN 2013
ENERGY CONSUMING RESOURCE: GAS, ELECTRICITY,
WATER, USING SYSTEM AIRCONDITIONER
SENSOR: BED ROOM (TEMPERATURE, HUMIDITY,
ILLUMINATION), LIVING ROOM (TEMPERATURE,
HUMIDITY, ILLUMINATION), ROOM 1 (TEMPERATURE),
ROOM 2 (TEMPERATURE), VERANDA 1 (TEMPERATURE),
VERANDA 2 (TEMPERATURE)
RESIDENT INFORMATION AND AVERAGE RESIDENTIAL
DURATION: TWO PEOPLE (A-24 HOURS,
B-12 HOURS<20:00~08:00>)

<RANK OF EXTRACTED SIMILAR GROUP>
CURRENT USER (RANK:50/80)
  :MONTHLY ENERGY COSTS 39,740
  (ELECTRICITY: 32,130 WON, WATER 3,600 WON,
  GAS: 4,010 WON)

0. GROUP AVERAGE
  :MONTHLY ENERGY COSTS 33,510 WON
  (ELECTRICITY: 28,010 WON, WATER:
  3,010 WON, GAS: 2,490 WON)

1. USER A (103/105)
  :MONTHLY ENERGY COSTS 26,420 WON
  (ELECTRICITY: 21,310 WON, WATER:
  2,100 WON, GAS: 3,010 WON)

2. USER B (ANONYMOUS)
  :MONTHLY ENERGY COSTS 27,130 WON
  (ELECTRICITY: 22,130 WON, WATER:
  2,200 WON, GAS: 2,800 WON)

3. USER C (104/101)
  :MONTHLY ENERGY COSTS 27,520 WON
  (ELECTRICITY: 22,100 WON, WATER:
  2,600 WON, GAS: 2,910 WON)
  ...

FIG. 8

<COMPARATIVE INFORMATION>
1. TARGET TEMPERATURE OF BED ROOM (AUTO)
2. TARGET TEMPERATURE OF LIVING ROOM (AUTO)
3. TARGET TEMPERATURE OF ROOM 1 AND 2 (SEMI-AUTO)
4. TEMPERATURE OF VERANDA 1 AND 2 (ONLY REPORT)
5. ELECTRICITY USAGE OF REFRIEDGERATOR (ONLY REPORT)
6. OPERATING TIME OF WASHING MACHINE (SEMI-AUTO)
...

FIG. 9

```
<REPORT>
1. TARGET TEMPERATURE OF BED ROOM (AUTO)
  : 8:00(CANCELLATION OF SET TARGET TEMPERATURE),
    20:50 (SETTING TARGET TEMPERATURE AS 28°)
2. TARGET TEMPERATURE OF LIVING ROOM (AUTO)
  : 8:00 (SETTING TARGET TEMPERATURE AS 28°),
  20:50 (CANCELLATION OF SET TARGET TEMPERATURE)
3. TARGET TEMPERATURE OF ROOM 1 AND 2 (SEMI-AUTO)
  : (NO SET TARGET TEMPERATURE),
4. TEMPERATURE OF VERANDA 1 AND 2 (ONLY REPORT)
  : TEMPERATURE GRAPH (IMAGE 1)
    02:00 (VERANDA VENTILATION ON)
    08:00 (VERANDA VENTILATION OFF)
5. ELECTRICITY USAGE OF REFRIEDGERATOR (ONLY REPORT)
    OPERATING TIME OF WASHING MACHINE (SEMI-AUTO)
  : 02:00 (OPERATION→DETAILED SETTINGS),
  ...
```

RESIDENTIAL-AREA-ENERGY-MANAGEMENT APPARATUS AND METHOD USING SOCIAL NETWORK

CROSS-REFERENCE TO RELATED APPLICATION(S)

This application claims priority from Korean Patent Application No. 10-2015-0018924, filed on Feb. 6, 2015, in the Korean Intellectual Property Office, the entire disclosure of which is incorporated herein by reference for all purposes.

BACKGROUND

1. Field

The following description relates to an energy management technology, and more particularly to a management apparatus and method for reducing energy costs in a residential area.

2. Description of the Related Art

30% or more of energy production across the world is consumed by buildings, and effective and efficient energy saving policies have been introduced and implemented in many countries to manage and reduce the energy consumption of the buildings. Various energy management systems including a Building Energy Management System (BEMS) are now used to manage energy consumption of commercial buildings.

In addition, a Home Energy Management System (HEMS) has been introduced to help manage energy consumption at home.

The introduction of these systems is partly due to the worldwide agreement on cutting CO2 emission. CO2 generated when producing or consuming energy is the main culprit of the greenhouse effect. To cut CO2 emission, many governments around the world encourage individuals, corporates, and organizations to use energy more efficiently, and have implemented efficient and smart energy saving policies and strategies to meet mandatory reductions in CO2.

Under these circumstances, some commercial buildings have adapted a Building Automation System (BAS) and the BEMS to combine various kinds of information generated in the buildings for energy management. While the BEMS is used relatively widely and considered useful, the HEMS still remains in an embryonic stage of development.

Specifically, the HEMS merely collects and shows energy consumption information on each household with or without environment information thereof.

The HEMS predicts energy usage or energy costs of this month, but it does not require highly sophisticated technologies, as opposed to the BEMS. Specifically, the HEMS usually provides only history information about previous usage and the like (e.g., information for the same month of the last year) so that it is not very practical or useful.

For example, even in the case where some households have the same number of residents with the same structure (e.g., the same-sized house in the same complex) and the same location (e.g., a floor and a direction in which a veranda is faced), electricity costs, water costs, and maintenance fees may vary from household to household. That is, even in the case where a household pays more electric costs twice or more than any other household under the same conditions, the household may not be able to know not only which type of energy is inefficiently used, but whether the household's costs for electricity and water are greater than average costs among other households under the same conditions.

While energy consumption of commercial buildings are managed and analyzed integratedly in the group unit basis, knowledge on how to use energy, manage energy consumption, and solve any energy-related problem is not shared within a residential area due to the fear for privacy infringement.

For example, in the hot summer time, one user may set an air-conditioner to arbitrary target temperature to cool indoor temperature, while another user may set an air-conditioner to operate periodically. However, without comparing the two ways, nobody knows which way is better for reducing energy costs in the environment where the two users lives.

Thus, efforts have been made to propose a method for measuring and analyzing operational states, setting information, and energy consumption of an energy consuming device and providing a user with the measurement. One step further, there is even a method for providing a user with energy usage information on a different user with lifestyle and behavioral patterns similar to those of the user.

In addition, these kinds of methods allows a user to receive energy usage information and energy costs information from a utility company, to share the received information with neighbors, and to be given reward points according to an energy usage pattern, thereby encouraging the user to save more energy. In addition, these methods also allows the user to exhibit energy usage information and energy costs information on a social network service (SNS), for example Facebook.

However, energy usage information, energy costs, and an energy consuming device's operation pattern and setting information are personal information, so users do not want to make it public.

Even when these kinds of information on different households are given, a user does not know how to apply the information to his life. It is because of the following reasons: a user may find it hard to adjust an energy usage strategy according to energy prices that vary from one time period to another time period; every user has a different lifestyle and behavioral patterns; different subsidiary materials, such as sashes, are used in the same-sized house on the same floor; and every user may use different devices.

In addition, electronic cars have been introduced, and the gap between electricity costs among resident living in the same residential area may become greater depending on whether a resident possesses an electronic car and charge it within a residential area.

Furthermore, gas boilers that can generate power have been developed and used, and people can produce electricity at home using the boilers. Thus, simply comparing electricity usage and electricity costs is not a method that can reflect this trend or situation. On top of that, advanced energy technologies, such as solar, wind, hydrogen, and the like, have been introduced and applied to some kind of home appliances. If the home appliances are used at home, it need to analyze or decide whether which energy source is more effective at which point in time.

In conclusion, a residential area, such as an apartment complex or a multi-building complex, provides identical or similar environments to the residents, and each resident manages their own house without well-organized energy strategies. If energy usage of households in the same residential area are managed systematically and efficiently, it will bring great benefits not only for individual households, but for the country.

SUMMARY

The following description relates to an energy management apparatus and method for a residential area, by which energy cost information on users in the same residential area is shared and applied to reduce energy costs.

In one general aspect, there is provided an energy management method for a residential area, including: in response to an energy management request from a user who lives in the residential area, collecting environment information and energy information on a household of the user; selecting an imitation target among households which have environment information and energy information similar to the environment information and the energy information on the household of the user from among all households in the residential area; setting a method for applying the energy information on the imitation target; and controlling energy management of the household of the user according to the set method.

In another general aspect, there is provided an energy management method for a residential area, the method which is performed by a server providing an energy management social network and comprises: collecting environment information and energy information from one or more energy management terminals from an energy social network; in response to an imitation request from a particular energy management apparatus, providing the particular energy management apparatus with energy information on households living in the residential area and having environment information similar to environment information reported by the particular energy management apparatus; and providing reward points to a user of the particular energy management apparatus that reported the provided energy information.

In yet another general aspect, there is provided an energy management apparatus for a residential area, including: an information collector configured to, in response to an energy management request from a user who lives in the residential area, collect environment information and energy information on a household of the user; an imitation target selector configured to select an imitation target from among households living in the residential and having environment information similar to the environment information of the household of the user; a setting component configured to set an a method for applying energy information on the imitation target; and a controller configured to control energy management of the household of the user according to the set method.

In yet another general aspect, there is provided an energy social network server including: an information collector configured to collect environment information and energy information from one or more energy management apparatuses over an energy social network; an information provider configured to, in response to an imitation request from a particular energy management apparatus, providing the particular energy management apparatus with energy information on households living in the residential area and having environment information similar to environment information reported by the particular energy management apparatus; and a reward manager configured to provide reward points to a user of the particular energy management apparatus that reported the provided energy information.

Other features and aspects may be apparent from the following detailed description, the drawings, and the claims.

BRIEF DESCRIPTION OF THE DRAWINGS

FIG. 6 is a diagram illustrating an example of initial environment information and initial energy information according to an exemplary embodiment.

FIG. 7 is a diagram illustrating an example of information on a comparative household group according to an exemplary embodiment.

FIG. 8 is a diagram illustrating an example of an imitation target pattern required for selecting an imitation target according to an exemplary embodiment.

FIG. 9 is a diagram illustrating an example of controlling setting information according to an exemplary embodiment.

Figure 1:
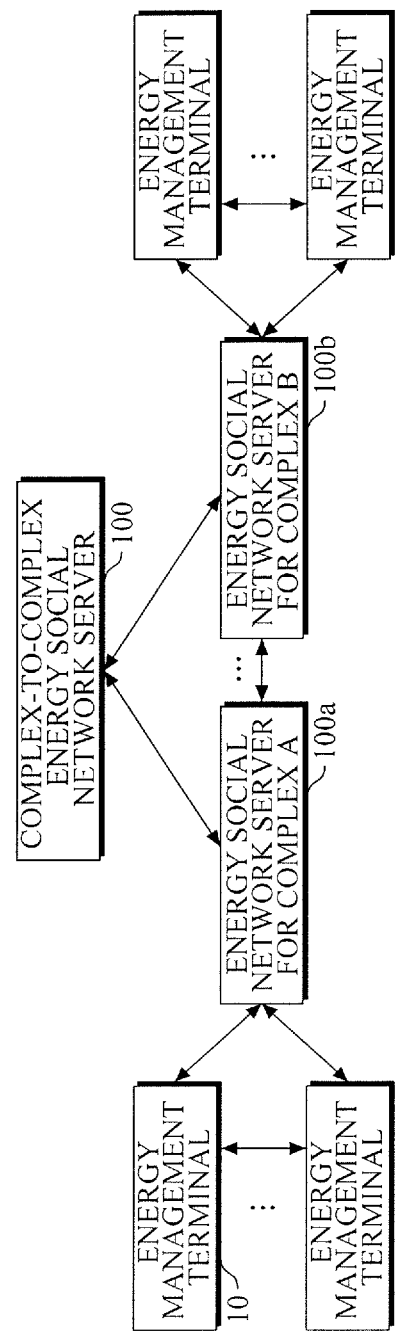
FIG. 1 is a diagram illustrating an energy management system in a residential area using a social network according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an energy management system for a residential area using a social network according to an exemplary embodiment.

Referring to FIG. 1, an energy management system for a residential area using a social network includes one or more energy management terminals 10 and energy social network servers 100, 100a, and 100b.

The energy management terminal 10 is an energy management apparatus for a residential area, such as an apartment complex. The energy management terminal 10 is installed at every house in a residential area for energy management. For example, the energy management terminal 10 may collect environment information and energy information through sensors or apply a control signal to an energy device, such as a heater.

According to an exemplary embodiment, the energy management terminal 10 may manage energy by imitating energy information on a different household in the same residential area. To this end, the energy management terminal 10 select an imitation target by acquiring information from the energy social network servers 100, 100a, and 100b. Once an imitation target is selected, the energy management terminal 10 may update data by transmitting and receiving the data with respect to an energy management terminal of the imitation target through peer-to-peer communication for a purpose of protection of personal information.

The energy social network servers 100, 100a, and 100b provides an energy social network service to provide energy management information to the energy management terminal 10. The energy social network servers 100, 100a, and 100b may be classified into servers 100a and 100b, each configured to provide an energy social network in a single residential area, and a server 100 configured to provide an energy social network over which the servers 100a and 100b communicate with each other.

Figure 2:
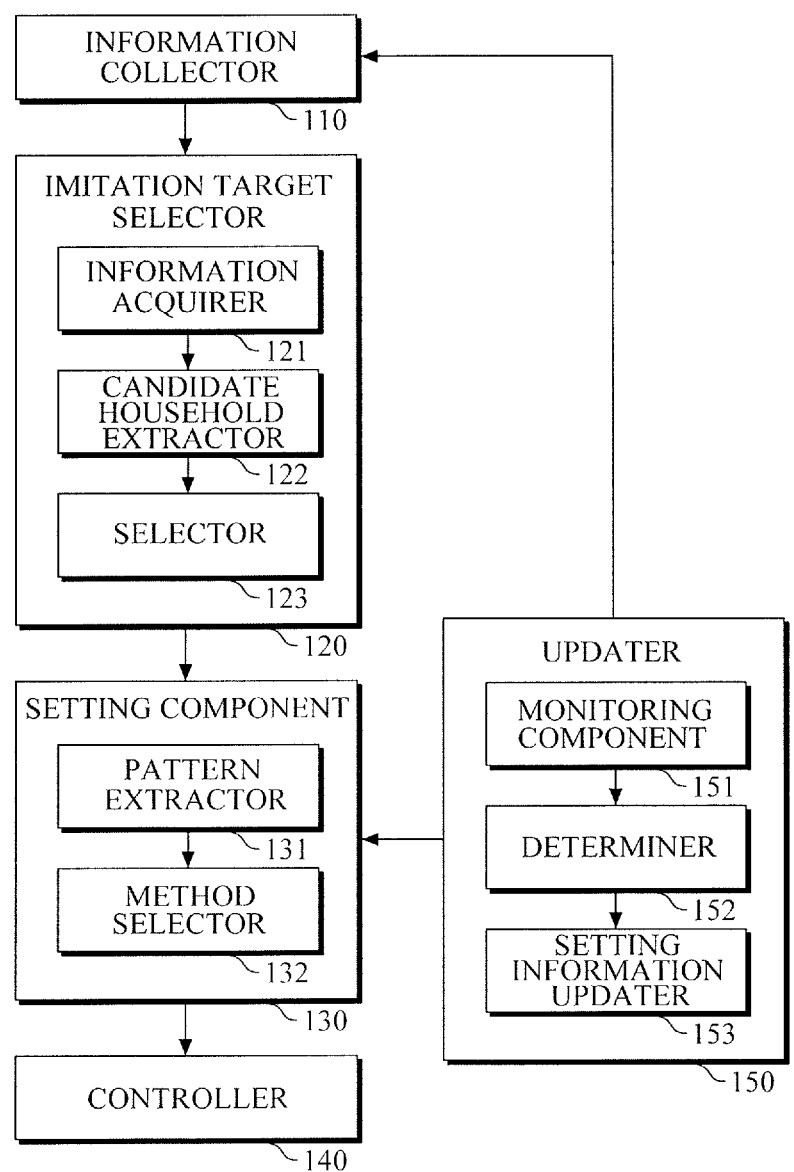
FIG. 2 is a diagram illustrating an energy management terminal according to an exemplary embodiment.

FIG. 2 is a diagram illustrating an energy management terminal according to an exemplary embodiment.

Referring to FIG. 2, an energy management terminal 10 includes an information collector 110, an imitation target selector 120, a setting component 130, and a controller 140. In addition, the energy management terminal 10 may further include an updater 150.

In response to a request from a user who lives in a residential area, the information collector 110 collects environment information and energy information on a household of the user. The environment information includes construction information (e.g., floor, a house's orientation information-southern, corridor/stair-type, year of foundation, etc.), energy consuming resource information (e.g., gas <gas stove, gas oven>, electricity <system air-conditioner, refrigerator, washing machine, computer body, computer monitor, TV, inner/outer charger of an electric car, Electronic Switching System (ESS), Renewable Energy Device (RED), Distributed Energy Resource (DER), etc.>, water <sink, toilet, washstand, shower tap, verandal, etc.>), sensor information (e.g., temperature, humidity, illumination, Passive Infrared Movement (PIR), etc.), resident information (e.g., the number of residents, residential duration, etc.), energy usage setting information (e.g., target temperature of each room, value set in an air-conditioner, etc.), and the like. In the case where electricity, water, and gas are the types of energy primarily used at home, the energy information may include electricity information, for example, total electricity usage for given period, electricity generation/consumption of an electricity generating/consuming device for given period, electricity bills up to last month, electricity prices for given period, and the like. In addition, the information collector 110 may collect information on an electricity consuming device that is outside a house but belongs to a household, such as an electric car. Moreover, the information collector 110 collects water-information, such as total water usage for given period, water usage by tap for given period, water bills up to last month, water prices for given period, and the like. Furthermore, the information collector 110 collects gas information, such as total gas usage for given period, gas usage of each gas device for given period, gas bills up to last month, and the like.

According to an exemplary embodiment, the information collector 110 may provide the collected information to the energy social network servers 100, 110a, and 110b or another energy management terminal with or without anonymity according to whether personal/household information is set to be anonymous.

The imitation target selector 120 selects an imitation target amongst households which have environment information similar to collected environment information in the same residential area. According to an exemplary embodiment, the imitation target selector 120 includes an information acquirer 121, a candidate household extractor 122, and a selector 123.

The information acquirer 121 acquires information on a comparative household group from an energy social network server. That is, the information acquirer 121 acquires, from the energy social network servers 100, 100a, and 100b, environment information and energy information on all the households in the residential area where a user lives. The information on a comparative household group is basically anonymous information.

Based on the acquired information, the candidate household extractor 122 extracts candidate households which have environment information similar to the environment information on the household of the user from among all the households in the residential area.

The selector 123 selects an imitation target from among the extracted candidate households. According to the present disclosure, the following three examples are possible.

In one embodiment, the selector 123 may select an imitation target from among the extracted candidate households. For example, a household with the number of residents and residential duration similar to those of the user's household among households in south-facing houses on the first floor may be selected as an imitation target.

In another embodiment, a representative value of energy information on the extracted candidate households may be selected as an imitation target.

In yet another embodiment, the selector 123 may select one or more high ranked households among the extracted candidate households as an imitation target. For example, one or more households highly ranked in terms of low energy costs in a comparative household group may be selected as an imitation target.

The imitation target selector 120 may select an imitation target according to selection of a user or according to recommendation provided by the energy management terminal 10 through analysis.

The setting component 130 sets a method of applying energy information on an imitation target. According to an exemplary embodiment, the setting component 130 includes a pattern extractor 131 and a method selector 132.

The pattern extractor 131 extracts one or more patterns to be imitated, by comparing environment information and energy information on an imitation target with the environment information and energy information of a user. A pattern to be imitated may be extracted through analysis or learning by applying context awareness, ontology, or the like. Alternatively, a follower who has agreed to share energy usage information may directly register a pattern and twit the registered pattern. For example, a 'sleeping' state may be extracted through analysis, for example, by applying ontology. In another example, a follower may directly register a pattern of a 'sleeping' state and share the registered pattern.

The method selector 132 selects at least one of an automatic method, a semi-automatic method, and a manual method. The automatic method is to control energy in totally accordance with a pattern to be imitated; the semi-automatic method is to control energy by modifying part of a pattern to be imitated; and the manual method is to control energy based on information directly input by the user in response to a report on a pattern to be imitated. For example, in a case where there is a difference in operational time and target temperature of an air-conditioner between a user and an imitation target and the user selects the air-conditioner as an imitation device, the user needs to determine whether to follow the settings and operations of the air-conditioner of the imitation target. Since the imitation target is ranked high in terms of low energy costs, the imitation target's know-hows to use energy efficiently may be reflected in the energy information thereof. Therefore, by setting to applying the energy information without analyzing or extracting the know-hows, the user may be able to reduce energy costs efficiently.

The controller 140 controls energy management of a house of the user according to a set method. Once a pattern to be imitated occurs, the controller 140 may modify control settings of a corresponding device to be customized for the user, thereby enhancing the user's convenience and amenity to the utmost. Once the controlling operation starts, a control status is displayed on a user's device and a user may select 'Opt-out' for cancellation, 'Override' for modifying the setting to be customized for the user and thus controlling a corresponding energy device upon occurrence of a pattern to be imitated, or 'Opt-in' for returning to a previous status after cancellation or modification. By allowing the energy management terminal 10 to learn the number and situations of these selection events and change patterns thereof and notifying a user of selection of an imitation target, it is possible to improve validity of the user's selection.

The updater 150 includes a monitoring component 151, a determiner 152, and a setting information updater 153.

The monitoring component 151 monitors environment information and energy information both of an imitation target and a user. According to an exemplary embodiment, for the sake of information protection, the monitoring component acquires the environment information and energy information, not via an energy social network server, directly from an energy management terminal that is in charge of energy management of a house of the imitation target.

The determiner 152 determines based on a monitoring result whether there is an imitated pattern to be updated. In response to discover of a pattern to be imitated, the setting information updater 153 resets the method for imitating energy information. For example, the setting information updater 153 may select a comparative household group, compare a user's household with the comparative household group in real time, and, in response to a difference between a user's household and a comparative household group being greater than a significant level (e.g., 2*deviation, 2*variance), reset a method for applying energy information. In a case where a control temperature value of each room is greater than twice of the standard deviation of the comparative household group, the setting information updater 153 may set control temperature of each room as average temperature of the comparative household group without the user's confirmation, and notify the user of the changed setting.

Figure 3:
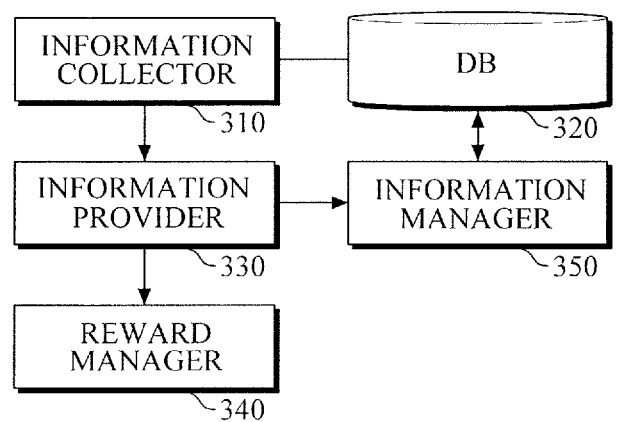
FIG. 3 is a diagram illustrating an energy social network server according to an exemplary embodiment.

FIG. 3 is a diagram illustrating an energy social network server according to an exemplary embodiment.

Referring to FIG. 3, an energy social network server includes an information collector 310, a database (DB) 320, an information provider 330, a reward manager 340, and an information manager 350.

The information collector 310 collects environment information and energy information from one or more energy management terminals over an energy social network, and stores the collected information in the DB 320.

In response to an imitation request from a particular energy management terminal, the information provider 330 provides the particular energy management terminal with energy information on households living in the same residential area and having environment information similar to environment information reported by the particular energy management terminal.

The reward manager 340 gives reward points to a user of an energy management terminal that reported energy information. For example, in the case of making contraction with all the households in a residential area, a utility company may give, to the households, reward points that can be translated into a discounted amount of money in return for the contraction. In another example, a utility company gives reward points using which a user may access, share, and apply an energy saving strategy of a different user. In addition, the reward manager 340 needs to provide not just a system analyzing and comparing energy usage between users based on shared information, but information on energy usage patterns of users who efficiently save energy and a systematic apparatus that is capable of imitating the energy usage patterns.

The energy information manager 350 ranks all the collected energy information by frequency of provision thereof.

Figure 4:
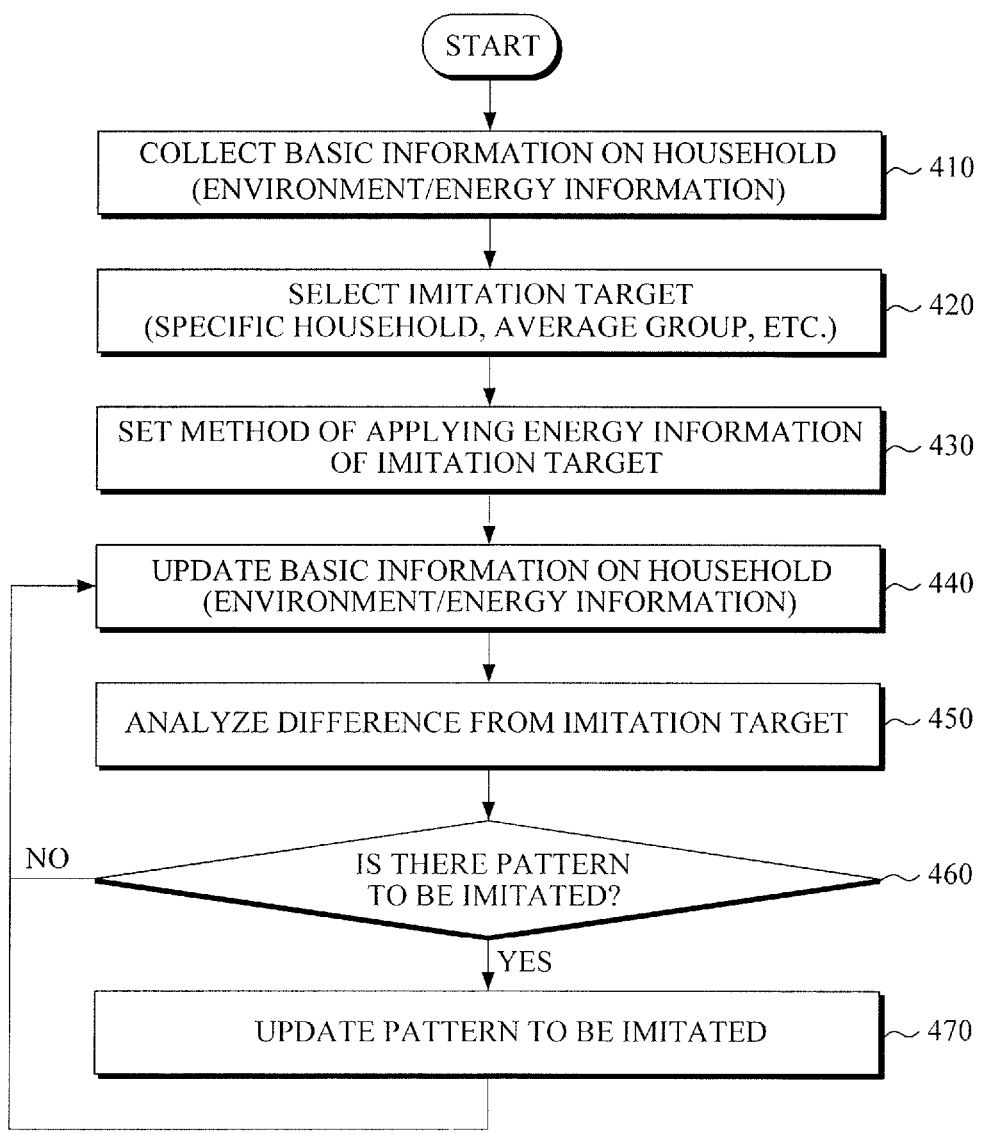
FIG. 4 is a flowchart illustrating an energy management method of an energy management terminal for a residential area according to an exemplary embodiment.

FIG. 4 is a flowchart illustrating an energy management method for a residential area, the method which is implemented by an energy management terminal, according to an exemplary embodiment. FIG. 4 is described with reference to FIGS. 1 and 2.

Referring to FIG. 4, in response to an energy management request from a user living in a residential area, the information collector 110 of the energy management terminal 10 collects environment information and energy information on all the households in the residential area in 410.

The environment information includes construction information (e.g., floor, a house's orientation information-southern, corridor/stair-type, year of foundation, etc.), energy consuming resource information (e.g., gas <gas stove, gas oven>, power <system air-conditioner, refrigerator, washing machine, computer body, computer monitor, TV, inner/outer charger of an electric car, Electronic Switching System (ESS), Renewable Energy Device (RED), Distributed Energy Resource (DER), etc.>, water <sink, toilet, washstand, shower tap, verandal, etc.>), sensor information (e.g., temperature, humidity, illumination, Passive Infrared Movement (PIR), etc.), resident information (e.g., the number of family members, residential duration, etc.), energy usage setting information (e.g., target temperature of each room, value set in an air-conditioner, etc.), and the like. In the case electricity, water, and gas are the types of energy primarily used at home, the energy information may include electricity information, for example, total electricity usage for given period, electricity generation/consumption of an electricity generating/consuming device for given period, electricity bills up to last month, electricity prices for given period, and the like. In addition, the information collector 110 may collect information on an electricity consuming device that is outside a house but belongs to a household, such as an electric car. Moreover, the information collector 110 collects water information, such as total water usage for given period, water usage by tap for given period, water bills up to last month, water prices for given period, and the like. Furthermore, the information collector 110 collects gas information, such as total gas usage for given period, gas usage of each gas device for given period, gas bills up to last month, and the like.

In addition, the information collector 110 may provide the collected information to the energy social network servers 100, 110a, and 110b or to another energy management device with or without anonymity according to whether personal/household information is set to be anonymous.

The imitation target selector 120 of the energy management terminal 10 selects an imitation target from among households living in the same residential area and having environment information similar to environment information that is collected in 420. According to an exemplary embodiment, the imitation target selector 120 acquires information on a comparative household group from an energy social network server. That is, the imitation target selector 120 acquires, from the energy social network servers 100, 100a, and 100b, environment information and energy information on all the households in the same residential area where the user lives. The information on a comparative household group is basically anonymous information. Based on the acquired information, the imitation target selector 120 extracts candidate households which have environment information similar to the environment information on a household of a user from among all the households in the residential area. Then, the imitation target selector 120 selects an imitation target from among the extracted candidate households. According to the present disclosure, the following three examples are possible.

In one embodiment, an imitation target may be selected from among the extracted candidate households. For example, a household with the number of residents and residential duration similar to those of a user's household among households living in south-facing houses on the first floor may be selected as an imitation target.

In another embodiment, a representative value of energy information on the extracted candidate households may be selected as an imitation target.

In yet another embodiment, one or more highly ranked households among the extracted candidate households may be selected as an imitation target. For example, one or more households highly ranked in terms of low energy costs in a comparative household group may be selected as an imitation target.

The imitation target selector 120 may select an imitation target according to selection of a user or according to recommendation provided through analysis by the energy social network servers 100, 100a, and 100b or the energy management terminal 10.

The setting component 130 of the energy management terminal 10 sets a method for applying energy information on an imitation target in 430. According to an exemplary embodiment, the setting component 130 may extract one or more imitation patterns by comparing environment information and energy information between a user and the imitation target. A pattern to be imitated may be extracted through analysis or learning by applying context awareness, ontology, or the like. Alternatively, a follower may directly register a pattern of a 'sleeping' state and share the registered pattern. Then, the setting component 130 selects one method from an automatic method, a semi-automatic method, and a manual method for each extracted imitation pattern. The automatic method is to control energy in totally accordance with a pattern to be imitated, the semi-automatic imitation pattern is to control energy by modifying part of a pattern to be imitated, and the manual method is to control energy based on information directly input by a user in response to a report on a pattern to be imitated. For example, in a case where there is a difference in operational time and target temperature of an air-air conditioner between a user and an imitation target and the user selects the air-conditioner as an imitation device, the user needs to determine whether to follow the settings and operations of the air-conditioner of the imitation target. Since the imitation target is ranked high in terms of low energy costs, the imitation target's know-hows to use energy efficiently may be reflected in the energy information thereof. Therefore, by setting the energy information to be applied without analyzing or extracting the know-hows, the user may be able to reduce energy costs efficiently.

The controller 140 of the energy management terminal 10 controls energy management of a household of the user by applying the method that is set in 440. In response to occurrence of a pattern to be imitated, the controller 140 controls a corresponding energy device. At this point, the controller 140 may adjust control setting of the energy management terminal for the sake of convenience and amenity of the user. Once a controlling operation starts, a control status is displayed on a screen of the energy management terminal 10 (At this point, a user may select 'Opt-out' for cancellation, 'Override' for modifying the setting to be customized for the user and thus controlling a corresponding energy device upon occurrence of a pattern to be imitated, or 'Opt-in' for returning to a previous status after cancellation or modification. By allowing the energy management terminal 10 to learn the number and situations of these selection events and change patterns thereof and notifying a user of selection of an imitation target, it is possible to improve validity of the user's selection.

In 450, the updater 150 of the energy management terminal 10 monitors environment information and energy information regarding both of an imitation target and a user. According to an exemplary embodiment, for a purpose of information protection, the updater 150 acquires the environment information and energy information on the imitation target, not via an energy social network server, directly from an energy management terminal that is in charge of energy management of a household of the imitation target.

The updater 150 analyzes difference between the imitation target and the user based on the monitoring result in 460, and determines, based on a monitoring result, whether there is an imitated pattern to be updated in 470.

As the imitated pattern to be updated is found in 470, the updater 150 resets a method for applying energy information. For example, an image target may be selected and compared with a user's household in real time, and, if difference between the imitation target and the user's household is found greater than a significant level (e.g., 2*deviation, 2*variance), the updater 150 may reset a method for applying energy information. In a case where a control temperature value of each room is greater than twice of the standard deviation of a comparative household group, control temperature of each room may be set as average temperature of the comparative household group without the user's confirmation, and then the user may be informed of the changed setting.

Figure 5:
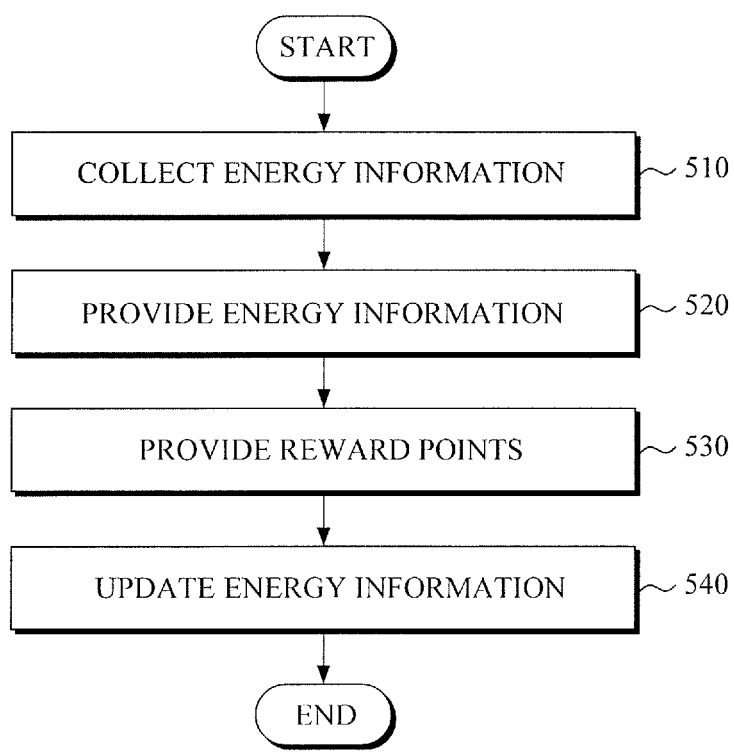
FIG. 5 is a flowchart illustrating an energy management method of an energy social network server for a residential area according to an exemplary embodiment.

FIG. 5 is a flowchart illustrating an energy management method for a residential area, the method which is implemented by an energy social network server, according to an exemplary embodiment. FIG. 5 is described with reference to FIG. 3.

Referring to FIG. 5, the information collector 310 of an energy social network server collects environment information and energy information from one or more energy management terminals over an energy social network, and stores the collected information in the DB 320 in 510.

In 520, in response to an imitation request from a particular energy management terminal, the information provider 330 provides the particular energy management terminal with energy information on households living in the same residential area and having environment information similar to environment reported by the particular energy management terminal.

In 530, the reward manager 340 gives reward points to a user of the particular energy management terminal which reported the energy information. For example, in the case of making contraction with all the households in a residential area, a utility company may give, to the households, reward points that can be translated into a discounted amount of money in return for the contraction. In another example, a utility company gives reward points using which a household may access, share, and apply an energy saving strategy of a different household. In addition, not only a system which analyzes and compares energy usage between users based on shared information, but also information on energy usage patterns of users who efficiently save energy and a systematic apparatus which is capable of imitating the energy usage patterns of the users need be provided.

In 540, the energy information manager 350 ranks energy information by frequency of provision thereof.

With reference to FIGS. 6 to 10, there are provided examples in which the present disclosure is applied in energy management for cooling.

FIG. 6 is a diagram illustrating an example of initial environment information and energy information according to an exemplary embodiment.

The energy management terminal 10 may collect basic information shown in FIG. 6 or may receive an input thereof. After selecting, from among the collected information, information necessary for determining an imitation target, the energy management terminal 10 may receive, from an energy social network server, candidate households in the same residential area, and may display a location of a user and extracted group average information.

FIG. 7 is a diagram illustrating an example of information on a comparative household group, the information required for selecting an imitation target, according to an exemplary embodiment.

FIG. 7 shows a case where user A ranked on the top is selected as an imitation target and setting information of an energy consuming device is set.

FIG. 8 is a diagram illustrating an example of an imitation target pattern required for selecting an imitation target according to an exemplary embodiment.

Referring to FIG. 8, target temperature of a bed room and a living room is set to be automatically sync with target temperature used by user A. In addition, target temperature of rooms 1 and 2 is set to be semi-automatically sync with target temperature used by user A after change in temperature is reported and then a user's confirmation is made.

Using temperature of a verandas, a user is able know a heat-blocking state/open state/close state of veranda window sashes. Temperature of veranda 1 and temperature of veranda 2 are not automatically synchronized, but just reported to a user. The temperature may be compared for analysis later. If electricity price and water price are changed in real time, a point in time to apply energy information is semi-automatically synchronized, thereby reducing energy costs.

Figure 10:
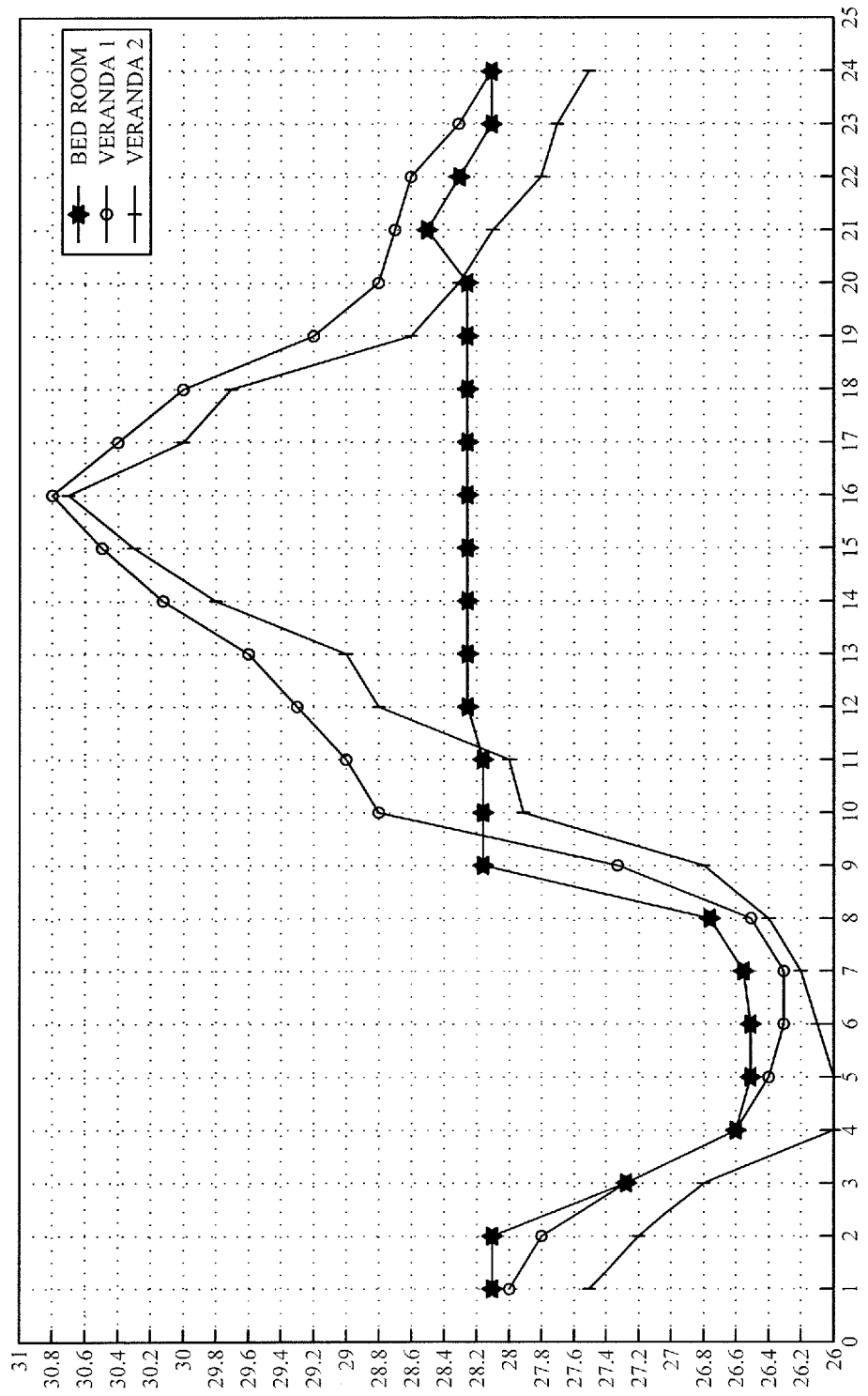
FIG. 10 is a graph illustrating temperature change led by controlling setting information according to an exemplary embodiment.

FIG. 9 is a diagram illustrating an example of controlling setting information according to an exemplary embodiment, and FIG. 10 is a graph showing temperature change led by controlling setting information according to an exemplary embodiment.

Referring to FIGS. 9 and 10, a report on change in setting information reveals that target temperature of an air-conditioner installed in a bed room is set be at 28 Celsius degrees, while temperature of the bed room drops nearly to temperature of outdoor air (e.g., temperature of the verandas 1 and 2) from the dawn till the morning (e.g., between 2 am and 8 am) because the bed room is ventilated to let the outdoor air inside, thereby leading to reduced energy costs (e.g., ventilating operation between 2 am and 8 am). User A allows a resident living in Apartment house No. 103-105 to access his information. Thus, over an energy social network, a user may provide information on a specific ventilating means (e.g., a ventilator, an air conditioner, and any other automatic ventilation system) and settings thereof (e.g., an operation method) to a friend or colleague, and check information on a different friend.

A user applies exactly the same energy information on a target in the above example. However, even in a case where all the residents leaves a house before 8 am and the fact that there is no one in the house is found at time when initial information is updated, as opposed to a comparative pattern, applying the comparative pattern stops, and therefore, the cooling operation does not work. The information indicating that there is no one in the house may be updated based on resident information that is inferred based on sensor information reported by PIR sensors, or may be updated as a server or system perceives that there is no one in the house.

The present disclosure proposes an easier and specific method for reducing energy costs in a residential area.

The present invention not only provides and compares energy usage and electric bills of residents under similar living conditions, but analyzes, shares, and provides energy consuming patterns of the residents with or without anonymity, so that the residents may copy or apply energy usage setting information of one another to reduce energy costs.

Furthermore, the present disclosure may spur the competition in good faith among constructors and administrators over the energy social network, possibly leading to a change in demands for a residential area (e.g., an increase in demands for a residential area that is efficient at reducing energy costs).

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An energy management method for a residential area including houses which are in the same complex and are the same in size, number of residents, floor, and directions of verandas, comprising:

in response to an energy management request from a user who lives in the residential area, collecting environment information and energy information on a household of the user;

selecting an imitation target among households which have environment information and energy information similar to the environment information and the energy information on the household of the user from among all households in the residential area;

extracting one or more patterns to be imitated, by comparing environment information and energy information on the imitation target with the environment information and the energy information regarding the user;

selecting at least one method from an automatic method, a semi-automatic method, and a manual method for each of the one or more extracted patterns to be imitated; and controlling energy management of the household of the user based on the selected at least one method from the automatic method, a semi-automatic method, and the manual method for the household of the use, wherein the environment information comprises energy usage setting information, wherein the energy information on the household of the user includes an electricity consuming device that is used outside a house but belongs to the household.

2. The energy management method of claim 1, wherein the energy information comprises at least one of total electricity usage for given period, electricity production/consumption of each power producing or consuming device for given period, electricity bills up to last month, and electricity prices for given period.

3. The energy management method of claim 1, wherein the selecting of an imitation target comprises:

acquiring information on a comparative household group from an energy social network server;

based on the acquired information, extracting candidate households which have environment information similar to the environment information regarding the user from among all the households in the residential area; and selecting one of the extracted candidate households as an imitation target.

4. The energy management method of claim 1, wherein the selecting of an imitation target comprises:

acquiring information on a comparative household group from an energy social network server;

based on the acquired information, extracting candidate households which have environment information similar to the environment information regarding the user from among all the households in the residential area; and selecting a representative value of energy information on the extracted candidate households as an imitation target.

5. The energy management method of claim 1, wherein the selecting of an imitation target comprises:

acquiring information on a comparative household group from an energy social network server;

based on the acquired information, extracting candidate households which have environment information similar to the environment information regarding the user from among all the households in the residential area; and selecting at least one of high ranked households among the extracted candidate households as an imitation target.

6. The energy management method of claim 1, further comprising:

monitoring the environment information and the energy information on the imitation target and the environment information and the energy information regarding the user; and determining, based on a monitoring result, whether there is an imitated pattern to be updated; and in response to a discover of the imitated pattern to be updated, resetting the method for applying the energy information on the imitation target.

\* \* \* \* \*